John W. Payne
Frederick E. Ray
Howard W. Shea
INVENTORS

BY Charles G. Huggett
ATTORNEY

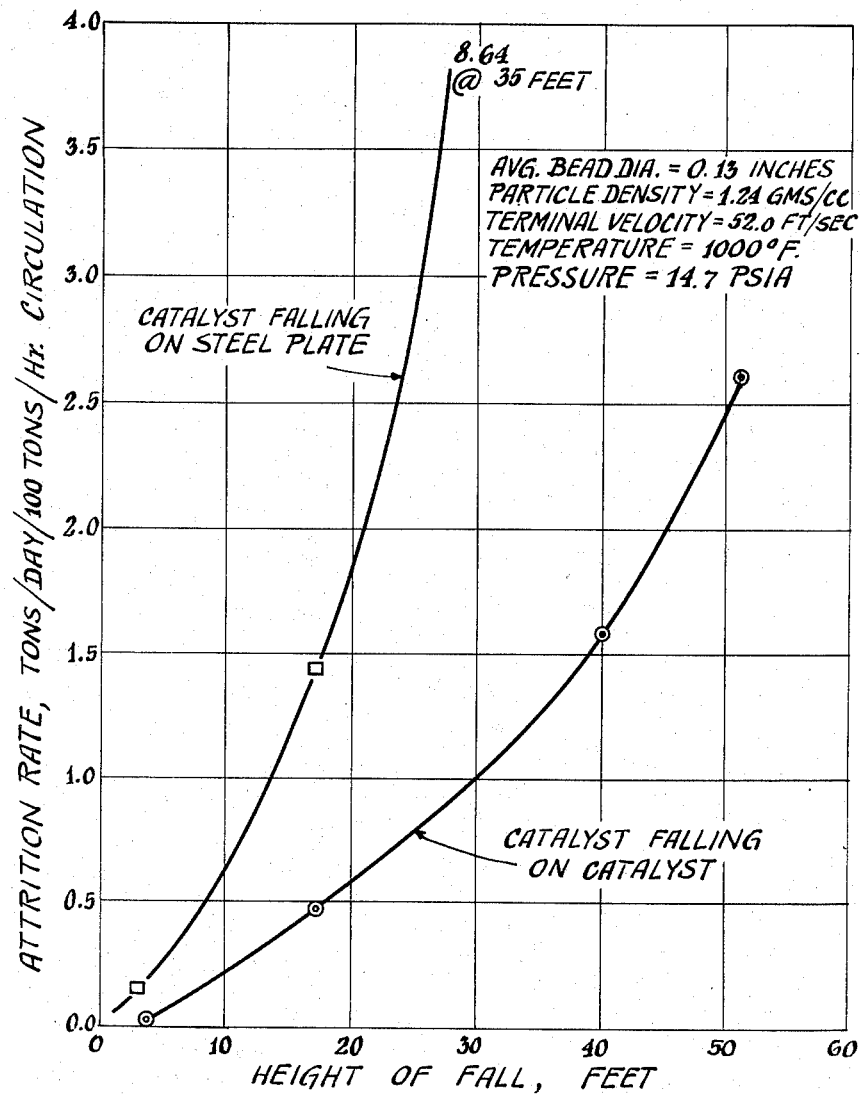

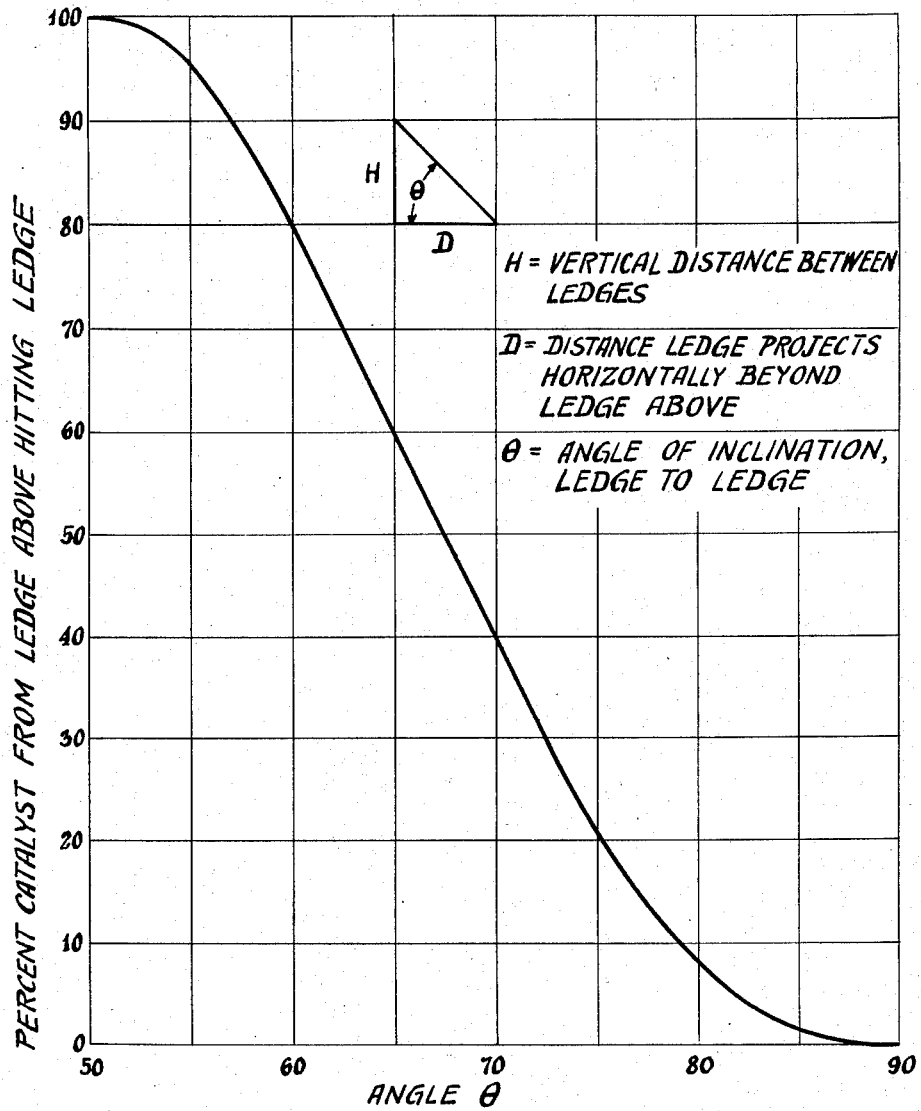

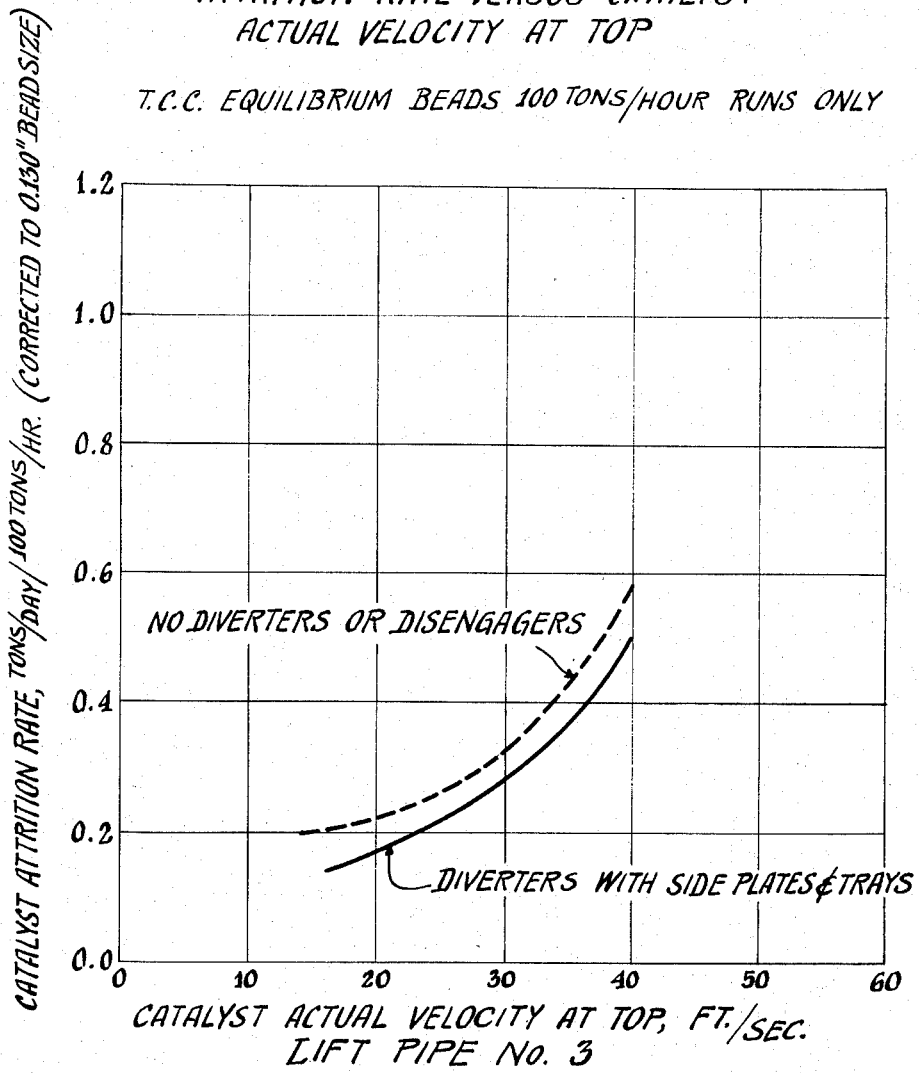

United States Patent Office 2,873,147
Patented Feb. 10, 1959

2,873,147
GAS SOLIDS SEPARATION IN A PNEUMATIC LIFT

John W. Payne, Woodbury, Frederick E. Ray, Glen Rock, and Howard W. Shea, Woodbury, N. J., assignors to Socony Mobil Oil Company, Inc., a corporation of New York Continuation of abandoned application Serial No. 399,664, December 22, 1953, which in turn is a division of abandoned application Serial No. 306,456, August 26, 1952. This application January 13, 1958, Serial No. 708,483

11 Claims. (Cl. 302—59)

This invention pertains to pneumatic lifts used to convey granular solid particles in a stream of lift gas from a location at one elevation to a location at a higher elevation. It is particularly concerned with pneumatic lifts used to raise granular contact material in continuous moving bed hydrocarbon conversion processes.

Various processes are known in the petroleum art which utilize a hot granular contact material as catalyst or heat carrying medium to effect continuous conversion of hydrocarbons. The solid material is passed in the form of a compacted bed through reaction and reconditioning zones and lifted from the bottom of one bed to the top of the other to complete a continuous enclosed cyclic system. Typical processes are hydrogenation, desulfurization, coking, reforming and cracking. The reactant is passed through the voids in the bed of solids in the reaction zone and the reaction products are removed continuously from the other side of the bed. During conversion, a carbonaceous deposit usually forms on the surface of the contact material to a greater or lesser extent, depending upon the particular process. This carbonaceous deposit is removed by burning in the reconditioning zone.

The contact material may be made from natural or treated clays, such as bauxite, montmorillonite or kaolin or from synthetic materials, such as alumina, silica, chromia or combinations thereof. The granular material may be catalytic or absolutely or substantially inert. The inerts may be formed of Corhart, Mullite or Carborundum. Various size ranges have been found suitable for the different processes, which may vary broadly from about 3–100 mesh Tyler. For example, in catalytic cracking, the range of particle size may suitably be from about 4–10 mesh Tyler. It is preferred that the particles be of uniform shape, such as pellets, pills, capsules or spheres and of about the same size. This provides uniform voids in the bed, providing for unrestricted flow of gas through the bed of solids with the gas being distributed uniformly through the bed. It is desirable, for this and other reasons, therefore, to avoid excessive breakage of the particles during transit through the system. The broken particles, called fines, generally interfere with the conversion operation, causing excessive channelling and excessive pressure drops across the beds. Since the fines must be removed and replaced by fresh catalyst, excessive breakage makes the process materially more expensive and involved.

Recent moving bed conversion processes utilize dilute phase pneumatic lifts to effect continuous elevation of the contact catalyst. The particles are blown through an upwardly directed lift pipe in a stream of rapidly moving lift gas from a level beneath one of the contacting zones to a level above the other contacting zones. The term "dilute phase lift" is used to indicate a lift in which the particles are conveyed upwardly through the lift pipe as a suspension in a stream of rapidly moving lift gas. This form of lift contrasts with a solid flow lift in which the particles are moved upwardly through the lift largely by gas pressure across the lift and the particles are maintained in the lift pipe in substantially compact columnar form. The gas in dilute phase lifts is separated from the particles in a separating zone at the top of the lift passage, and the separated particles are gravitated downwardly from the separating zone as a compact column into the contacting zone. A high level of particle breakage has been found to occur in the separation step. The particles issue from the top of the lift pipe in the form of a fountain. In order to insure that all the particles clear the top of the lift pipe, the particles are discharged from the top at a fairly substantial upward velocity. They travel a substantial distance above the top of the pipe before being reduced to zero velocity and hence, fall a substantial distance before reaching a bed surface maintained about the lift pipe in the lower portion of the separating vessel. The particles collide with the bed surface with considerable force, the force being sufficient to cause high particle breakage. Also, many particles fall back into the lift pipe where they collide with other particles issuing from the pipe with a force sufficient to cause excessive particle breakage.

It is an object of this invention to provide an apparatus and method of lifting a granular contact material through an upwardly directed lift passage in a stream of lift gas and separating the gas and solids in a separating zone at the top of the lift passage with minimum attrition.

It is a further object of this invention to provide an apparatus and method of separating a granular contact material out of a stream of rising lift gas and lowering the separated material onto a gravitating bed of the contact material with minimum fracture of the particles.

It is a further object of this invention to provide an improved apparatus and method of conveying a granular material pneumatically from one level to a higher level.

It is a further object of this invention to provide in a continuous moving bed hydrocarbon conversion system which incorporates a pneumatic transfer device for lifting the granular material from a feed tank to a separating vessel suspended in a stream of lift gas an improved method and apparatus for separating the solids from the gas in the separating vessel with minimum attrition.

These and other objects will be discussed in the following detailed description of the invention and the attached drawings showing the apparatus involved.

Figure 5 is a plot of Attrition v. Height of Fall of Catalyst Beads of both catalyst on catalyst and catalyst on steel.

Figure 6 is a curve showing the effect of the angle formed by the outer edge of a vertically spaced group of ledges in the separator with the horizontal upon the percent of catalyst from the ledge above hitting the ledge below.

Figure 7 is a plot of attrition versus catalyst velocity of the top of the lift pipe both without a diverter and trays and with a diverter and trays.

In one broad aspect of the invention, a granular contact material is suspended in a lift gas and transferred upwardly through a lift passage. As the particles are discharged upwardly from the top of the passage into a separation zone of enlarged cross-section, they are deflected out of the vertical projection of the lift passage toward the side wall of the separator. A multiplicity of shelves are located on the inner wall of the separator in spaced relationship above the upper end of the lift passage, with each shelf being projected further toward the center of the separator than the shelf above by an amount sufficient to catch a substantial portion of the particles which cascade downwardly from said shelf. The shelves are preferably arranged close enough so that the drop between successive shelves is not sufficient to cause substantial catalyst breakage. The spacing between the shelves is adjusted also in the preferred form of the invention to provide a continuous layer of catalyst along the inner wall of the separator, so as to prevent wear of the metal wall by impingement of the deflected contact material.

Figure 1:
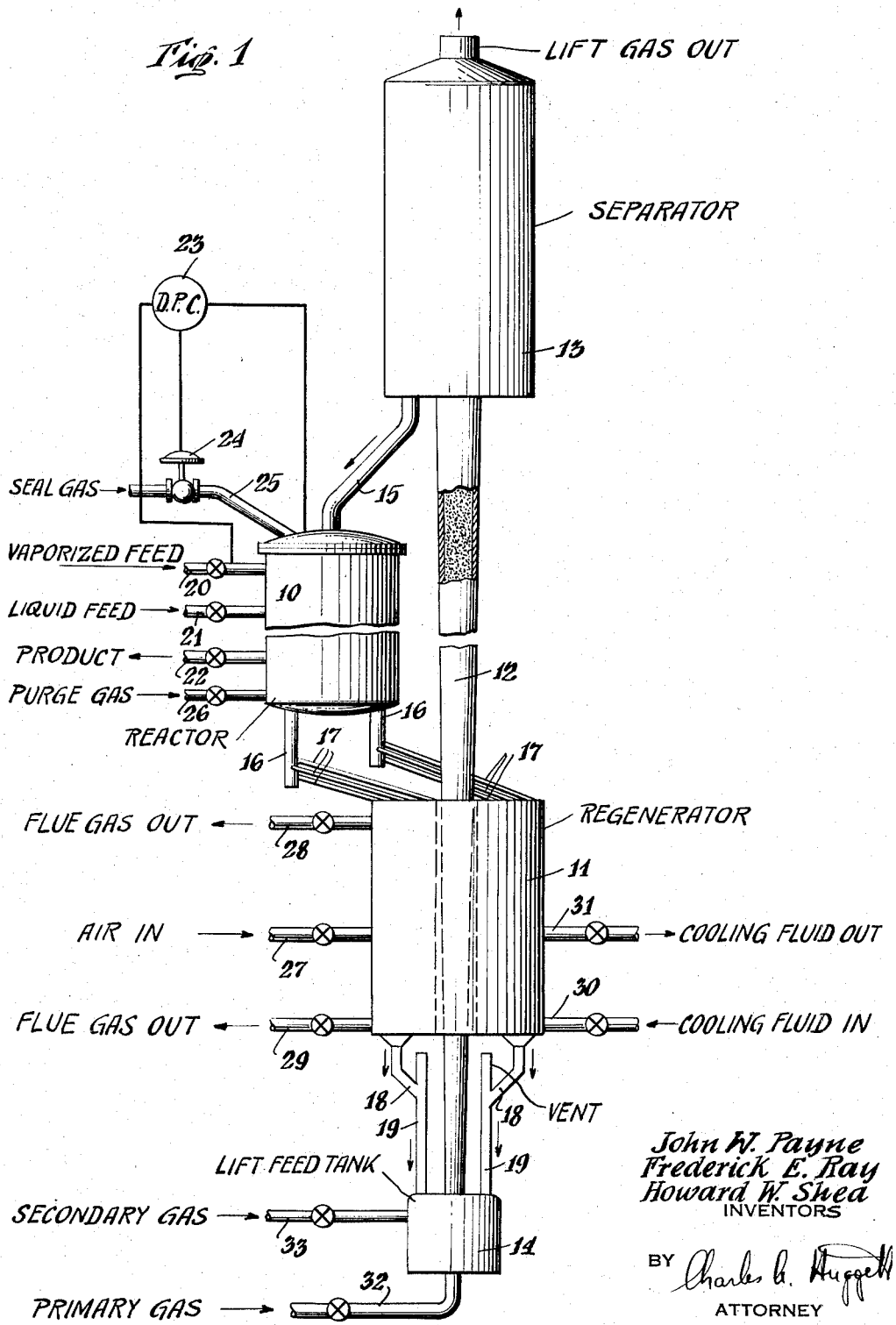
Figure 1 shows a complete moving bed conversion system which incorporates a pneumatic lift.

The invention will now be disclosed as it applies to a catalytic cracking system, with reference first to the diagrammatic showing of the complete moving bed system, shown on Figure 1. A superposed reactor 10 and kiln 11 is shown with a pneumatic lift pipe 12 located alongside these vessels. A separator 13 is located about the top of the pipe 12 and a lift feed tank 14 is located about the bottom of the pipe. A feed leg 15 is located between the separator and the reactor, conduits 16 and 17 are located between the reactor and kiln, and conduits 18, 19 are located between the kiln and lift feed tank. A continuous unobstructed path is formed thereby from the separator down through the reactor and kiln to the lift feed tank.

In operation, a bed level of contact material is maintained about the upper end of the lift pipe in the lower portion of the separator 13 and particles are continuously withdrawn from the bottom of the separator through the elongated feed leg 15 in substantially compact form. The gas pressure in the reactor 10 is usually advanced and hence, the feed leg 15 is made long enough to insure that the particles feed smoothly into the reactor vessel against the advanced pressure. The pressure may be about 5-30 p. s. i. (gauge). The solid contact material is passed downwardly through the reaction vessel in the form of a compacted bed and is continuously removed from the bottom of the vessel via the conduits 16, 16 in substantially compact columnar form. The vaporized feed is introduced into the vessel 10 through the conduit 20 and liquid feed may be charged via the conduit 21. The reactants pass downwardly through the voids in the bed and the converted products are withdrawn from the bottom of the bed via the conduit 22. A differential pressure controller 23 is used to control seal valve 24 in seal gas line 25, so as to prevent the reactants from rising up the feed leg. A small amount of seal gas passes upwardly through the seal leg 15 and thereby confines the reactants to the reaction zone. A suitable purge gas is introduced into the bottom of the vessel 10 via the conduit 26 to strip the catalyst of vaporizable hydrocarbons in the bottom of the reaction zone. The temperature in the reactor is usually about 800-1000° F., suitable reaction temperature.

The spent catalyst is introduced into the top of the kiln 11 via the multiplicity of conduits 17, which are uniformly distributed about the top of the regeneration vessel 11. The kiln 11 has an annular cross-section, the lift pipe 12 being projected through the central passage. The contact material is gravitated downwardly through the kiln in the form of an annular column of solids. Air is introduced into the kiln 11 at an intermediate level via the conduit 27 to travel both upwardly and downwardly through the bed. Carbonaceous contaminant on the surface of the catalyst is burned therefrom and the flue gas is removed from the top and bottom of the bed via the conduits 28, 29. The kiln is generally operated at or near atmospheric pressure, and at a temperature of about 1000-1300° F. Excessive temperatures may heat damage the catalyst and hence, a cooling fluid is introduced into cooling coils in the kiln via the conduit 30 and withdrawn therefrom via the conduit 31.

The regenerated contact material is gravitated downwardly from the bottom of the kiln as a compact column through the conduits 18, 18 and 19, 19 into the top of the lift feed tank 14. The catalyst forms a compact bed of solids about the lower end of the lift pipe 12. A primary gas pipe 32 is projected upwardly into the bottom of the tank 14 and is terminated just below the lift pipe. The major portion of the lift gas is introduced into the lift pipe via this pipe without passing through the bed of solids in the tank 14. A minor portion of the lift gas is introduced into the lift tank 14 via the conduit 33 at locations laterally displaced from the lift pipe, so that this gas must pass through a substantial thickness of the bed of solids before it enters the lower end of the lift pipe. This minor portion of the gas, denominated secondary gas, pushes the contact material into the primary stream, and mingles with the primary gas to effect the upward transfer of the particles. It has been found that for best results, the particles must be accelerated rapidly to a suitably high velocity in the lower portion of the lift and that the particle velocity must be reduced in the upper portion of the lift. The gas velocity in the lift is lowered by using a lift pipe having a gradually increasing cross-section from bottom to top. The lift pipe is tapered so that the particles are discharged from the top within the desired velocity range. It has also been discovered that in order to avoid surging in the upper portion of the lift and provide efficient discharge of the particles from the top of the lift, the average particle velocity as it issues from the top of the pipe should be broadly about 5-35 feet per second and preferably about 10-25 feet per second. The gas issuing from the top of the lift pipe expands in the separator because of the large cross-section of that vessel, thereby materially reducing the lifting force on the particles. However, the granular particles issuing from the top of the pipe possess appreciable momentum, and the particles are large enough and dense enough to resist following the laterally moving gas. Therefore, the particles proceed directly upward in the separator for an appreciable distance until the upward velocity of the particles is reduced to zero. The particles fall thereafter in the form of a fountain about the upper end of the lift pipe. A bed level is maintained about the upper end of the pipe and the particles are collected on the surface of the bed. However, a substantial portion of the upwardly moving particles fall directly down into the lift pipe and collide with the particles issuing therefrom. This collision causes high particle breakage. Excessive breakage occurs also when the particles hit the bed surface at high velocity.

Figure 2:
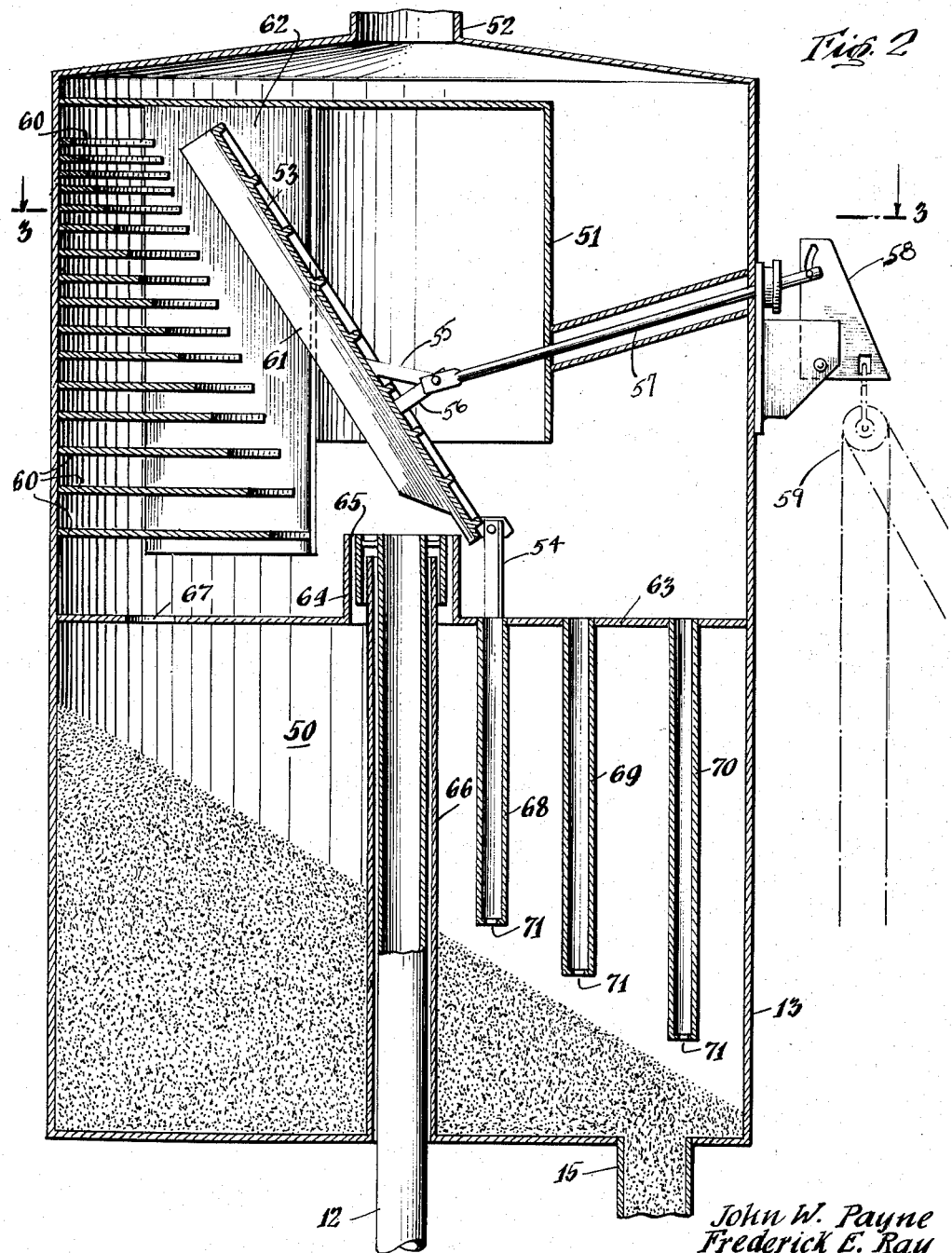
Figure 2 shows a vertical cross-section of the separating vessel located at the top of the lift pipe of Figure 1.
Figure 3:
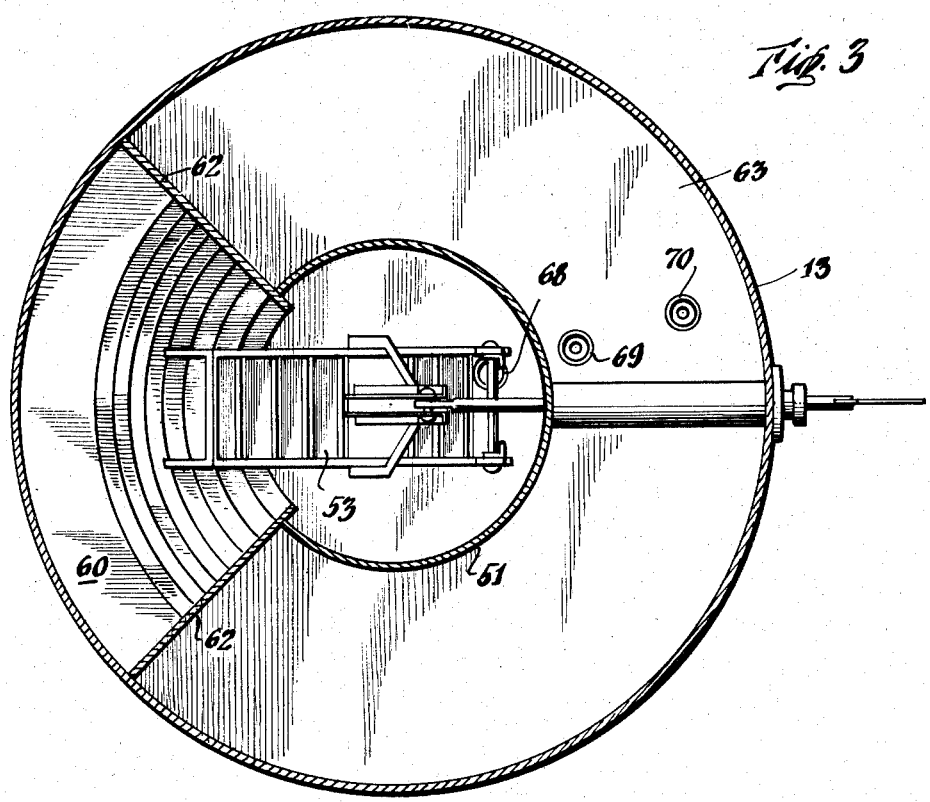
Figure 3 shows a horizontal cross-section of the separating vessel located at the top of the lift pipe of Figure 1 as seen on plane 3—3 of Figure 2.

Referring now to Figures 2 and 3, which show the interior of the separator 13, the invention will be more clearly disclosed. The lift pipe 12 is terminated at an intermediate level in the vessel 13 and the bed surface 50 is maintained somewhat below the upper end of the pipe 12 to provide space for surging and additional catalyst. A skirt baffle 51 is located above the lift pipe. The baffle has a diameter considerably larger than that of the lift pipe and is closed on top. An annular space is provided between the baffle 51 and the vessel walls from the upward flow of the lift gas. This gas is withdrawn from the vessel through the conduit 52 in the top of the vessel. The gas travels laterally after issuing from the top of the pipe but the particles proceed upwardly into the skirt section of the baffle 51. A deflector plate 53 is pivotally attached to a bracket 54 at a point near the top of the lift pipe but laterally displaced therefrom. The deflector plate is held in position by the support rods 55, 56 and connecting rod 57. The connecting rod connects to a bell crank 58 which is operated by a pulley system 59, whereby the angle of deflection of the plate 53 can be adjusted to effect minimum attrition of the particulate material. The skirt baffle 51 is opened along its side adjacent the deflector plate and a multiplicity of horizontal ledges or shelves 60 are arranged vertically along the inner wall of the vessel 13 opposite the slot. The ledges are attached to the inner wall of the vessel and extend into the vessel interior gradually increasing distances from top to bottom. Particles that are deflected onto the upper ledges by the deflector plate cascade to the next lower ledge and the distance the particles drop is rarely in excess of the distance between any ledge and the next lower ledge. The deflector plate 53 has side walls 61 on each edge of the plate so that the particles are prevented from bounding off the plate in a lateral direction. Vertical enclosure walls 62 are located on each side of the horizontal ledges to confine the solids to downward flow over the trays or ledges. The roof of the skirt baffle 51 is extended over the top of the side walls 62 to prevent gas from flowing through the slot in the skirt of the baffle and directly upward about the top of the baffle to the gas outlet 52. The particles fall from the bottom ledge onto the horizontal partition 63 and there form a bed of particles. A collar 64 is located about the top of the lift pipe on the partition 63. An annular passageway 65 is provided between the collar 64 and the lift pipe 12 to provide an overflow space for catalyst in the event of any tendency for catalyst to flood back into the lift pipe. A sleeve 66 is projected upwardly from the bottom of the vessel about the lift pipe to a level near the top of the pipe. The sleeve acts as a guide for the pipe but is not tightly connected to the pipe. This permits the long pipe to expand and contract freely under the influence of changing pipe temperature. The top of the lift pipe is rolled over the top of the sleeve to prevent particles from dropping down between the sleeve and the lift pipe. A hole 67 is provided in the partition plate 63 beneath the trays 60 to permit the solids to pass into the lower portion of the vessel 13 onto the surface of the bed 50. The solids are withdrawn from the bottom of the vessel 13 through the conduit 15. The conduit 15 is located on the opposite side of the vessel from the hole 67. The solids bed, therefore, slopes downwardly in the lower portion of the vessel at substantially the angle of repose of the catalyst which may be 24–45 degrees with the horizontal, depending upon the physical characteristics of the particles being used. Granular catalyst used in moving bed cracking processes usually has an angle of repose of about 30 degrees with the horizontal. Since the bed level of the bed 50 is high beneath the hole 67, the distance from the plate 63 to the bed surface is small and the particles may be permitted to drop freely on the bed without danger of fracture. At the other side of the partition 63, however, the drop may be greater and, therefore, drop pipes 68, 69 and 70 may be provided to gently lower the catalyst to the bed 50. Orifice plates 71, 71 are located at the lower end of the pipes 68, 69 and 70 to restrict the flow of solids through the pipes and maintain the solids in the pipe in substantially compacted form. The only free fall drop involved is, therefore, between the bottom of the pipes and the surface of the catalyst bed.

Figure 4:
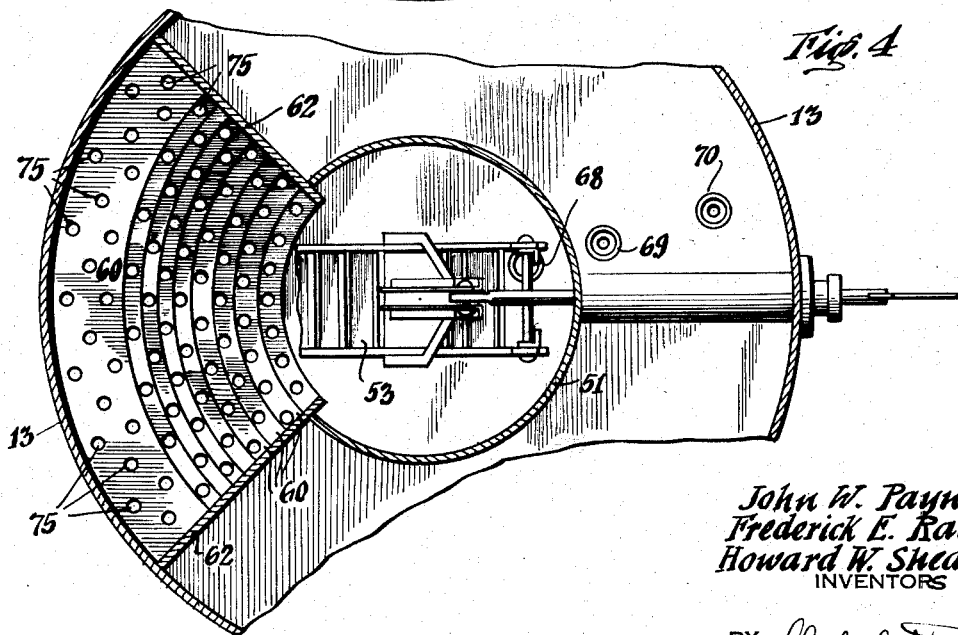
Figure 4 shows a vertical cross-section of a separator, illustrating an alternate embodiment of the invention.

Figure 4 shows an alternate embodiment of the invention. In this arrangement holes 75 are located in the trays 60 to permit a portion of the catalyst falling on each tray to pass downwardly to the tray below. The holes are staggered about the trays so that they do not line up vertically, therefore, the particles cannot drop through the holes a greater distance than to the next succeeding tray. This arrangement reduces the amount of catalyst that must cascade over the edge of the tray to the trays below.

Figure 5 shows a plot of catalyst breakage or attrition versus height of fall both for catalyst falling on catalyst and catalyst falling on metal plate. It is seen that as the height of fall of the particles increases, the breakage increases as substantially the square of the distance. For the range of drops found in moving bed conversion systems, it is seen that the attrition caused by catalyst falling on plate is always higher than catalyst falling on catalyst. It is, therefore, desirable to have the partition plate 63 of the separator of Figure 2 substantially covered with catalyst at all times.

Referring once again to Figure 2, it is seen that the shelves 60 are arranged and dimensioned so that the wall surface of the vessel 13 is covered with catalyst. Therefore, when catalyst is diverted against this wall by the deflector plate 53, there results a collision of catalyst against catalyst rather than a collision of catalyst against metal. This is shown to result in less attrition by Figure 5. Also, the wall is protected from the abrasive action of the catalyst particles. Therefore, there results less metal erosion. Since the shelves are of progressively less width at higher levels, they must also be spaced closer together at successively higher levels in order to keep the wall covered. This is necessary because the wall coverage by the catalyst is determined by an imaginary line drawn from the edge of any shelf upwardly and inwardly at the angle of repose (i. e., 25–40 degrees with the horizontal) of the catalyst and this line should intersect the wall of the housing at about the level of the shelf thereabove. It is permissible for this line to intersect the housing wall somewhat above the level of the shelf above, but not below that level, since the wall would be entirely covered in the former case but not in the latter.

The attrition due to the fall of catalyst onto a bed of solids increases as a power higher than the square of the distance. However, the attrition is not substantial up to about 5 feet. Therefore, the spill over type of letdown system shown in Figure 2 can be used successfully provided the distance of fall in any single spill is less than about 5 feet and preferably less than about 2 feet. This provides the maximum vertical spacing for the two lowermost shelves. As a practical matter, the minimum spacing of the two uppermost shelves should be at least 3 inches and preferably at least 6 inches. With respect to the width of the shelves, the top shelf should extend about 6 inches out from the wall and preferably 12 inches. The bottom shelf should extend out from the wall not less than 24 and preferably not less than 60 inches and should extend not greater than 180 inches and preferably not greater than 138 inches out from the wall. These widths depend upon the interrelation of the various dimensions of the parts of the separator. In order to facilitate the description of this relationship the following symbols are used:

$\omega$ = width of top shelf
$w$ = width of bottom tray
$\theta$ = angle an imaginary line in a vertical plane touching the edge of the trays makes with the horizontal
$\alpha$ = angle the diverter makes with the horizontal
$D$ = diameter of separator
$d$ = diameter of lift pipe at the top end
$H$ = height of shelves above top of lift pipe Preferably, the angle theta ($\theta$) should not be greater than 55° so that most of the catalyst falling from a shelf would be caught by the shelf immediately below it. However, $\theta$ is sometimes predetermined by dimensions of the separator and lift pipe in existing installations.

If the height ($H$) covered by the shelves is determined, the horizontal distance ($w-\omega$) between the top and bottom shelves is fixed for a given value of $\theta$. The dimension ($H$) depends upon the angle ($\alpha$) of the diverter, the velocity of the catalyst issuing from the top of the lift pipe, the diameter ($d$) of the lift pipe at the top, and the diameter ($D$), of the separator vessel.

Conversely, if the horizontal distance ($w-\omega$ between the top and bottom shelves is established, the height (H) covered by the shelves is fixed for a given value of $\theta$. The distance ($w-\omega$) depends upon the velocity of the catalyst falling between the bottom shelf and the lift pipe, the portion of the separator area covered by the shelves, the diameter ($d$) of the lift pipe at the top, and the catalyst circulation rate.

In the following example, we will set $\theta$ at 55°.

To find H, proceed as follows: If $\alpha$ is 60° and $d$ is 39 in., the maximum vertical distance from the top of the lift pipe to the diverter is 5'-8". If D is 15 ft., the maximum horizontal distance to be covered by the catalyst leaving the lift pipe before it hits the wall of the separator is 7'-6" minus 1'-7½" or 5'-10½". If the velocity of catalyst leaving the lift pipe is 15 ft./sec., the vertical distance between the highest point where catalyst hits the diverter and the point where catalyst collides with the separator wall is 0'-2". Thus, H should not be less than 5'-8" plus 0'-2" or 6'-0". If $w$ is set at 6 in., $$w = \frac{H}{\tan \theta} + \omega = \frac{6.0}{1.4282} + 0.5 = 4'-8\frac{1}{2}''$$

Thus, the distance between the bottom shelf and the lift pipe should be 5'-10½" minus 4'-8½" or 1'-2".

To find ($w-\omega$), proceed as follows: If the density of the catalyst falling between the bottom shelf and the nearest metal is estimated to be 5 lb./ft.³ (93% voids), and the average velocity of the catalyst falling through this space is 10 ft./sec., the distance between the bottom shelf and the nearest metal should not be less than 14 in. For this calculation the following assumptions were made: (1) 350 tons per hour catalyst circulation rate; (2) the ratio of the lift pipe at the top was 1'-7½"; and (3) the portion of the separator area covered by the shelves was 90°, or one-quarter. Hence, $\omega$ is equal to 7'-6" minus (1'-7½" plus 1'-2") or 4'-8½". If $\omega$ is assumed to be 6 in.

$$\theta = \tan^{-1}\frac{H}{(w-\omega)} = \tan^{-1}\frac{6.0}{4.208} = 55°$$

Thus, $\theta$ should not be below 55° to allow sufficient area between the bottom shelf and the nearest metal for falling catalyst to return to the bottom of the separator-surge vessel.

With respect to the overall height of the separator covered by the shelves, the trays should extend a vertical distance not more than above 15 feet above the top of the lift pipe and at least 6 feet thereabove. In the horizontal plane, the shelves should extend at least 90 degrees around the vessel if the deflector plate has side walls to confine the stream of deflected catalyst. If the plate is without side walls, the shelves must be extended to at least 120 degrees and preferably 180 degrees around the separator. The shelves preferably extend out horizontally but may slope up or down in less preferred forms of the invention. But, in any event, the shelves cannot slope down more than the angle of repose of the catalyst. The lowermost shelf is located near the top of the lift pipe and at least within about 2 feet thereof vertically. The bottom shelf is so spaced horizontally away from the lift pipe so that catalyst cascading from the shelf above does not spill onto the lift pipe. Preferably, the bottom shelf is spaced horizontally away from the pipe so that the density of the falling catalyst stream in the space between the edge of the bottom shelf and the nearest metal does not exceed 5 pounds per cubic foot, which for T. C. C. equilibrium beads corresponds to 94% voids. For a usual T. C. C. installation, this will be a space between the bottom shelf and the nearest metal about 8 inches long. With respect to the location of the inside edge of successive shelves, the angle $\theta$ formed by an imaginary line drawn in a vertical plane between the edges of the shelves with the horizontal should be small enough so that catalyst is caught from the shelf above and does not bounce past any of the shelves. Each shelf should catch preferably at least 95 percent of the catalyst from the shelf above and broadly at least 75 percent of the total spill. The angle theta ($\theta$) should be not greater than 75° and preferably not greater than 55° with the horizontal. Figure 6 shows a plot of the percent catalyst from the ledge above hitting the ledge versus the angle $\theta$.

The deflector plate may be a flat plate or preferably a U-shaped member as shown on Figure 2. The sides of the deflector aid in directing the catalyst and in preventing the particles from bounding laterally off the side of the plate. The deflector plate is preferably hinged to permit change in the angle of deflection, but not hinged in the broadest form of the invention. The angle of deflection is the angle formed by the longitudinal axis of the plate with the vertical. The proper angle of deflection is related to the velocity of the catalyst issuing from the lift pipe, as previously indicated. The deflector plate is pivoted as close as possible to the edge of the lift pipe. A good range of angle of deflection has been found to be about 10-30 degrees with the vertical. The deflector plate is at least as wide as the diameter of the lift pipe and preferably wider.

*Example*

| | |
|---|---|
| Height of lift pipe | 200 ft. |
| Diameter of lift pipe | 13.7 in. @ bottom 20.1 in. @ top. |
| Velocity of particles issuing from lift | 15 to 40 ft./sec. |
| Dimensions of separator | (where shelves are located)—7' diam. x 9' high. |
| Angle $\theta$ | varies from 50° @ top to 75° @ middle and bottom. |
| Deflection angle | optimum 10°-15° range 0°-25° (measured from vertical). |
| Dimensions of deflector | 6 ft. long x 2'-8" wide x ½" thick (later equipped with side plates which extended 10 in. beyond wearing surface). |
| Attrition with and without | see graph on Figure 7. |

It is to be understood that the specific examples of apparatus, design and arrangement, and of operation and application of this invention are intended only as illustrative of the invention and it is intended to cover all changes and modifications of the examples herein chosen for purposes of disclosure, which do not constitute departure from the spirit and scope of the invention.

This is a continuation of previously filed application Serial Number 399,664, filed December 22, 1953, now abandoned, which in turn is a division of application Serial No. 306,456, filed Aug. 26, 1952, now abandoned.

We claim:

1. Improved apparatus in a pneumatic lift for separating a granular solid from a supporting lift gas, which comprises in combination: a separator located about the upper end of the lift pipe, baffle means for diverting granular solids issuing from the top of the lift pipe laterally out of the vertical projection of the pipe, a series of vertically-spaced shelves located on the inner wall of said separator at levels above the top of the pipe, the shelves being projected inwardly in increasing amounts from top to bottom, so that an imaginary line drawn in a vertical plane and touching the edges of the shelves makes an angle of not more than 75 degrees with the horizontal, the shelves being spaced vertically so that an imaginary line drawn inwardly from the edge of each shelf at an angle of about 25-40 degrees with the horizontal will not hit the wall of the separator below the level of the shelf thereabove, means for withdrawing lift gas from the upper portion of the separator and means for withdrawing solids from the lower portion of the separator.

2. Improved apparatus in a pneumatic lift for separating a granular solid from a supporting lift gas, which comprises in combination: a separator located about the upper end of the lift pipe, baffle means for diverting granular solids issuing from the top of the lift pipe laterally out of the vertical projection of the pipe, a series of vertically spaced shelves located on the inner wall of said separator at levels above the top of the pipe, the shelves being projected inwardly in increasing amounts from top to bottom, so that an imaginary line drawn in a vertical plane and touching the edges of the shelves makes an angle of not more than 75 degrees with the horizontal, the shelves being spaced vertically so that the distance between any two adjacent shelves does not exceed 5 feet, means for withdrawing lift gas from the upper portion of the separator and means for withdrawing solids from the lower portion of the separator.

3. Improved apparatus in a pneumatic lift for separating a granular solid from a supporting lift gas, which comprises in combination: a separator located about the upper end of the lift pipe, baffle means for diverting granular solids issuing from the top of the lift pipe laterally out of the vertical projection of the pipe, a series of vertically-spaced shelves located on the inner wall of said separator at levels above the top of the pipe, the shelves being projected inwardly in increasing amounts from top to bottom, so that an imaginary line drawn in a vertical plane and touching the edges of the shelves makes an angle of not more than 75 degrees with the horizontal, the shelves being spaced vertically so that the distance between any two adjacent shelves does not exceed 2 feet, means for withdrawing lift gas from the upper portion of the separator and means for withdrawing solids from the lower portion of the separator.

4. Improved apparatus in a pneumatic lift for separating a granular solid from a supporting lift gas, which comprises in combination: a separator located about the upper end of the lift pipe, baffle means for diverting granular solids issuing from the top of the lift pipe laterally out of the vertical projection of the pipe, a series of vertically spaced shelves located on the inner wall of said separator at levels above the top of the pipe, the shelves being projected inwardly in increasing amounts from top to bottom, so that an imaginary line drawn in a vertical plane and touching the edges of the shelves makes an angle of not more than 75 degrees with the horizontal, the shelves being spaced vertically so that an imaginary line drawn inwardly from the edge at an angle of about 25–40 degrees with the horizontal will not hit the wall of the separator below the level of the shelf thereabove, the distance between any two adjacent shelves being not more than about 2 feet, means for withdrawing lift gas from the upper portion of the separator and means for withdrawing solids from the lower portion of the separator.

5. Improved apparatus in a pneumatic lift for separating a granular solid from a supporting lift gas, which comprises in combination: a separator located about the upper end of the lift pipe, baffle means for diverting granular solids issuing from the top of the lift pipe laterally out of the vertical projection of the pipe, a series of vertically-spaced shelves located on the inner wall of said separator at levels above the top of the pipe, the shelves being projected inwardly in increasing amounts from top to bottom, so that an imaginary line drawn in a vertical plane and touching the edges of the shelves makes an angle of not more than 75 degrees with the horizontal, the shelves being spaced vertically so that an imaginary line drawn inwardly from the edge at an angle of about 30 degrees with the horizontal will not hit the wall of the separator below the level of the shelf thereabove, the distance between any two adjacent shelves being not greater than about 2 feet, the minimum width of the top shelf being about 6 inches and the vertical elevation of the top shelf being about 15 feet above the top of the lift pipe, the minimum width of the bottom shelf being about 24 inches and the vertical elevation of the bottom shelf being about 0 feet above the top of the lift pipe, means for withdrawing lift gas from the upper portion of the separator and means for withdrawing solids from the lower portion of the separator.

6. Improved apparatus in a pneumatic lift for separating a granular solid from a supporting lift gas, which comprises in combination: a separator located about the upper end of the lift pipe, a deflector plate pivotally mounted adjacent the top of the lift pipe, at an angle of about 10–30 degrees with the vertical, so as to cover at least substantially the entire vertical projection of the lift pipe, a series of vertically-spaced shelves located on the inner wall of said separator opposite said deflector plate at levels above the top of the pipe, the shelves being projected inwardly in increasing amounts from top to bottom, and covering at least a 90-degree quadrant of the horizontal cross-section of the vessel, the shelves being arranged so that an imaginary line drawn in vertical plane and touching the edges of the shelves makes an angle of not more than 75 degrees with the horizontal, the shelves being spaced vertically so that an imaginary line drawn inwardly from the edge at an angle of about 25–40 degrees with the horizontal will not hit the wall of the separator below the level of the shelf thereabove, the distance between any two adjacent shelves being not greater than about 2 feet, the minimum width of the top shelf being about 6 inches and the maximum width of said shelf being about 12 inches, the minimum width of the bottom shelf being about 24 inches and the maximum width of the bottom shelf being about 180 inches, the vertical elevation of the top shelf being not greater than about 15 feet and the vertical elevation of the bottom shelf being not greater than about 2 feet above the top of the lift pipe, means for withdrawing lift gas from the upper portion of the separator and means for withdrawing solids from the lower portion of the separator.

7. Improved apparatus in a pneumatic lift for separating a granular solid from a supporting lift gas, which comprises in combination: a separator located about the upper end of the lift pipe, a deflector plate pivotally mounted adjacent the top of the lift pipe, at an angle of about 10–30 degrees with the vertical, so as to cover at least substantially the entire vertical projection of the lift pipe, a series of vertically-spaced shelves located on the inner wall of said separator opposite said deflector plate at levels above the top of the pipe, means defining holes in said shelves for transferring a portion of the solids on the shelf to the next lower shelf, the holes in the shelves being staggered so that none of the holes intercept the vertical projection of any of the holes in the shelf thereabove or the shelf therebelow, the shelves being projected inwardly in increasing amounts from top to bottom and covering at least a 90-degree quadrant of the horizontal cross-section of the vessel, the shelves being arranged so that an imaginary line drawn in vertical plane and touching the edges of the shelves makes an angle of not more than 75 degrees with the horizontal, the shelves being spaced vertically so that an imaginary line drawn inwardly from the edge at an angle of about 25–40 degrees with the horizontal will not hit the wall of the separator below the level of the shelf thereabove, the distance between any two adjacent shelves being not greater than about 2 feet, the minimum width of the top shelf being about 6 inches and the maximum width of said shelf being about 12 inches, the minimum width of the bottom shelf being about 24 inches and the maximum width of the bottom shelf being about 180 inches, the vertical elevation of the top shelf being not greater than about 15 feet and the vertical elevation of the bottom shelf being not greater than about 2 feet from the top of the lift pipe, means for withdrawing lift gas from the upper portion of the separator and means for withdrawing solids from the lower portion of the separator.

8. Improved apparatus in a pneumatic lift for separating a granular solid from a supporting lift gas, which comprises in combination: a separator located about the upper end of the lift pipe, a deflector plate pivotally mounted adjacent the top of the lift pipe, at an angle of about 10-30 degrees with the vertical, so as to cover at least substantially the entire vertical projection of the lift pipe, side walls attached to the side of the deflector plate, so as to prevent particles from bounding laterally off the side of the plate, a series of vertically-spaced shelves located on the inner wall of said separator opposite said deflector plate at levels above the top of the pipe, the shelves being projected inwardly in increasing amounts from top to bottom and covering at least a 90-degree quadrant of the horizontal cross-section of the vessel, the shelves being arranged so that an imaginary line drawn in vertical plane and touching the edges of the shelves makes an angle of not more than 75 degrees with the horizontal, the shelves being spaced vertically so that an imaginary line drawn inwardly from the edge at angle of about 25-40 degrees with the horizontal will not hit the wall of the separator below the level of the shelf thereabove, the distance between any two adjacent shelves being not greater than about 2 feet, the minimum width of the top shelf being about 6 inches and the maximum width of said shelf being about 12 inches, the minimum width of the bottom shelf being about 24 inches, the vertical elevation of the top shelf being not greater than about 15 feet and the vertical elevation of the bottom shelf being not greater than about 2 feet above the top of the lift pipe, means for withdrawing lift gas from the upper portion of the separator and means for withdrawing solids from the lower portion of the separator.

9. In a pneumatic lift the improved method of separating the suspended granular solids from the lift gas with minimum breakage of the particles, which comprises: discharging the suspended solids upwardly from the top of the lift passage into a separating zone of enlarged horizontal cross-section, so that the gas expands laterally and the upward velocity of the solids is rapidly reduced, baffling the flow of solids above the top of the lift passage to divert at least a substantial portion of the solids issuing from the top of the passage laterally, catching the diverted solids on a vertical series of beds of the particles maintained in the separating zone outside of the vertical projection of the lift passage, at least some of the beds being maintained at a substantial distance above the lift passage, transferring at least 75 percent of the solids falling on each bed downwardly in free-fall to the next lower bed, the distance between beds being below that distance which causes excessive breakage of the solids, discharging solids from the lowermost bed onto the surface of a bed of solids maintained below the top of the lift passage in the lower portion of the separating zone, withdrawing the lift gas from the upper portion of the separating zone and withdrawing the solids from the lower portion of the separating zone.

10. In a pneumatic lift the improved method of separating the suspended granular solids from the lift gas with minimum breakage of the particles, which comprises: discharging the suspended solids upwardly from the top of the lift passage into a separating zone of enlarged horizontal cross-section, so that the gas expands laterally and the upward velocity of the solids is rapidly reduced, baffling the flow of solids above the top of the lift passage to divert at least a substantial portion of the solids issuing from the top of the passage laterally, catching the diverted solids on a vertical series of beds of the particles maintained in the separating zone outside of the vertical projection of the lift passage, at least some of the beds being maintained at a substantial distance above the lift passage, transferring at least 75 percent of the solids falling on each bed downwardly in free-fall to the next lower bed, the distance between adjacent beds being less than five feet, discharging the solids from the lowermost bed onto the surface of a bed of solids maintained below the top of the lift passage in the lower portion of the separating zone, withdrawing the lift gas from the upper portion of the separating zone and withdrawing the solids from the lower portion of the separating zone.

11. In a pneumatic lift the improved method of separating the suspended granular solids from the lift gas with minimum breakage of the particles, which comprises: discharging the suspended solids upwardly from the top of the lift passage into a separating zone of enlarged horizontal cross-section, so that the gas expands laterally and the upward velocity of the solids is rapidly reduced, baffling the flow of solids above the top of the lift passage to divert at least a substantial portion of the solids issuing from the top of the passage laterally, catching the diverted solids on a vertical series of beds of the particles maintained in the separating zone outside of the vertical projection of the lift passage, at least some of the beds being maintained at a substantial distance above the lift passage, transferring at least 75 percent of the solids falling on each bed downwardly in free-fall to the next lower bed, the distance between adjacent beds being less than 2 feet, discharging the solids from the lowermost bed onto the surface of a bed of solids maintained below the top of the lift passage in the lower portion of the separating zone, withdrawing the lift gas from the upper portion of the separating zone and withdrawing the solids from the lower portion of the separating zone.

References Cited in the file of this patent

UNITED STATES PATENTS

| | | |
|---|---|---|
| 138,175 | Merrill | Apr. 22, 1873 |
| 1,498,630 | Jensen | June 24, 1924 |
| 2,656,920 | Kollgaard | Oct. 27, 1953 |
| 2,684,270 | McClure | July 20, 1954 |
| 2,689,153 | McClure | Sept. 14, 1954 |
| 2,705,664 | McClure | Apr. 5, 1955 |
| 2,720,424 | Hansen | Oct. 11, 1955 |